US008302465B2

(12) United States Patent
Johnson et al.

(10) Patent No.: US 8,302,465 B2
(45) Date of Patent: Nov. 6, 2012

(54) TRANSDUCER ASSEMBLY

(75) Inventors: Robert C. Johnson, Bristol (GB); Sean T. McNamara, Wigan (GB); Mark W. Cornborough, Goole (GB); Jennifer S. Ridley, Halesworth (GB)

(73) Assignee: Rolls-Royce PLC, London (GB)

( * ) Notice: Subject to any disclaimer, the term of this patent is extended or adjusted under 35 U.S.C. 154(b) by 125 days.

(21) Appl. No.: 12/945,115

(22) Filed: Nov. 12, 2010

(65) Prior Publication Data

US 2011/0138896 A1 Jun. 16, 2011

(30) Foreign Application Priority Data

Dec. 16, 2009 (GB) .................................. 0921885.0

(51) Int. Cl.
*G01M 15/14* (2006.01)

(52) U.S. Cl. .................................................... 73/112.01

(58) Field of Classification Search ................ 73/112.01
See application file for complete search history.

(56) References Cited

U.S. PATENT DOCUMENTS 4,463,610 A * 8/1984 Anderson et al. ............... 73/654
4,620,446 A * 11/1986 Jensen et al. .................... 73/652
4,640,133 A 2/1987 Lecuru et al.
4,779,246 A 10/1988 Dietzsch et al.
4,858,470 A * 8/1989 Kincaid et al. .................. 73/654
4,918,672 A 4/1990 Iwabuchi et al.
4,977,395 A * 12/1990 Bozeman, Jr. ................ 340/683
5,065,630 A * 11/1991 Hadcock et al. ................ 73/802
5,355,417 A * 10/1994 Burdisso et al. ............. 381/71.7
5,386,689 A * 2/1995 Bozich et al. ................... 60/803
5,515,444 A * 5/1996 Burdisso et al. ............. 381/71.5
5,706,358 A 1/1998 Ashworth
6,672,170 B1 1/2004 DiPaola
6,798,888 B1 9/2004 Howarth et al.
7,426,871 B2 * 9/2008 Saves-Saint-Germes et al. .............................. 73/802

FOREIGN PATENT DOCUMENTS

EP 0 334 795 A3 9/1989

* cited by examiner

*Primary Examiner* — Freddie Kirkland, III
(74) *Attorney, Agent, or Firm* — Oliff & Berridge, PLC

(57) ABSTRACT

A transducer assembly for connecting a transducer to a device, the transducer assembly having a transducer mount adapted to receive the transducer, and a clamp having first and second jaws, the first and second jaws being adapted to selectively clamp to a flange portion of the device. The transducer mount may include a housing, a resilient member, and first and second end walls. The first end wall may be operatively connected to the device. The transducer may be held within the housing and adjacent to the first end wall. The resilient member may be disposed between the transducer and the second end wall.

15 Claims, 6 Drawing Sheets

TRANSDUCER ASSEMBLY

This invention relates to a transducer assembly and particularly but not exclusively relates to a transducer mount and/or clamp for a gas turbine engine.

BACKGROUND

In order to monitor a device, transducers may be mounted to the device, which may for example be an engine, in particular a gas turbine engine. The transducer may sense acoustic stress waves, stress waves, vibration magnitudes and/or frequencies, temperatures, pressures, chemical compositions or any other environmental factors. As such, the transducers may assist in the development, monitoring or maintenance of the engine.

Acoustic stress waves, also referred to as "stress waves" or "acoustic emissions", are transient elastic waves within a material caused by the release of localised stress energy. The stress energy may be released by events such as cracking or rubbing of the microstructure of the material, and may occur before structural damage is visible.

FIGS. 1*a* and 1*b* show a transducer 2 mounted to a waveguide 4 which is in turn connected to a flange portion 6 of an engine. The shape of the waveguide 4 may be defined by the need to remove the transducer 2 from the immediate vicinity of the engine due to operating temperature limitations. The transducers may be mounted by bolting the waveguide 4 to the external flange portion 6. This requires the removal of a potentially critical casing bolt 8 that must then be properly reassembled with the waveguide 4 in place. The transducer 2 is typically coupled to the waveguide 4 simply by wrapping insulating tape around the transducer and waveguide. In the example shown, the transducer 2 converts energy from acoustic stress waves into an electrical signal and the signal is transmitted via an electrical cable 10.

There are, however, two main disadvantages with the current mounting system:

Firstly, the removal of the critical engine casing bolts in order to attach the waveguide is undesirable. Typically, this limitation has restricted testing to development engines only, particularly in the field of gas turbine engines. Developments in Engine Health Monitoring has advanced to the point where large amounts of actual engine data is required for analysis. The most effective way of obtaining this data is to test on production engines during pass-off testing due to the much higher rate at which they are tested. The removal of critical casing bolts is not desirable in this application as it may compromise the integrity of the engine.

Secondly, the use of insulation tape to connect the transducer to the waveguide is undesirable as it cannot provide a repeatable minimum contact pressure of the transducer with the waveguide.

The present invention therefore seeks to address these issues.

STATEMENTS OF INVENTION

According to a first aspect of the invention, there is provided a transducer mount for connecting a transducer to a device to be monitored, the transducer mount comprising a housing, a resilient member and first and second end walls, the first end wall being operatively connected to the device, wherein the transducer is held within the housing and adjacent to the first end wall, the resilient member being disposed between the transducer and the second end wall wherein the resilient member has a low Young's modulus to enable constant contact between the transducer and the first end wall.

The transducer mount may further comprise a removable end cap. The second end wall may be provided by the end cap.

The transducer mount may further comprise an elongate member adapted to connect the transducer mount to the device. The first end wall may be provided by the elongate member.

The housing may comprise a slot. The slot may be adapted to receive a cable projecting from the transducer.

The resilient member may comprise a foam material. The resilient member may have a Young's modulus of approximately 0.06 GPa.

According to a second aspect of the present invention there is provided a transducer assembly for connecting a transducer to a device to be monitored, the transducer assembly comprises: a transducer mount adapted to receive the transducer; and a clamp comprising first and second jaws, the first and second jaws being adapted to selectively clamp to a predetermined part of the device. For example, the first and second jaws may be adapted to selectively clamp to a flange portion of the device.

The clamp may further comprise a first tightener adapted to apply a first force to secure the first and second jaws either side of the flange portion. The first force may be applied at a location spaced apart from the flange portion of the device. The first tightener may comprise one or more first threaded bolts passing through the first and second jaws. The first threaded bolts may engage one or more corresponding first threaded portions provided on one or more of the first and second jaws. The first threaded bolt may comprise a head portion disposed so as to abut one of the first and second jaws. The other of the first and second jaws may be held by the first threaded portion. A resilient element may be provided between the head portion and the one of the first and second jaws. The resilient element may be a spring, Belleville washer, rubber washer or any other resilient means.

The clamp may further comprise a second tightener adapted to apply a second force to secure the first and second jaws to the device. The second force may be applied at a location spaced apart from the flange portion. The second force may be applied at a location spaced apart from the location at which the first force is applied. The first force may be applied at a location between the location at which the second force is applied and the flange portion.

The second tightener may comprise one or more second threaded bolts passing through a second threaded portion in one of the first and second jaws. An end of the second threaded bolt may be disposed so as to abut the other of the first and second jaws.

The second tightener may be under compression when the clamp is in the secured position. The first tightener may be under tension when the clamp is in the secured position.

The second tightener may be omitted. The first and second jaws may be pivoted with respect to one another. The first and second jaws may or may not cross at the pivot point. The pivot point may be located between the location at which the first force is applied and the flange portion. The location at which the first force is applied may be between the pivot point and the flange portion. Accordingly, the first tightener may be under a tensile or a compressive load when the clamp is in the secured position.

The clamp may further comprise one or more guides, which may be disposed to permit the first and second jaws to translate with respect to one another. One or more of the first and second jaws may comprise raised pads, which may be disposed so as to contact the flange portion of the device. The first and second jaws may be shaped to accommodate one or more bolts passing through the flange portion.

The above-described transducer assembly may further comprise the above-described transducer mount. A gas turbine engine may comprise the above-described transducer assembly and/or transducer mount.

BRIEF DESCRIPTION OF THE DRAWINGS

For a better understanding of the present invention, and to show more clearly how it may be carried into effect, reference will now be made, by way of example, to the accompanying drawings, in which:—

DETAILED DESCRIPTION

Figure 1A:
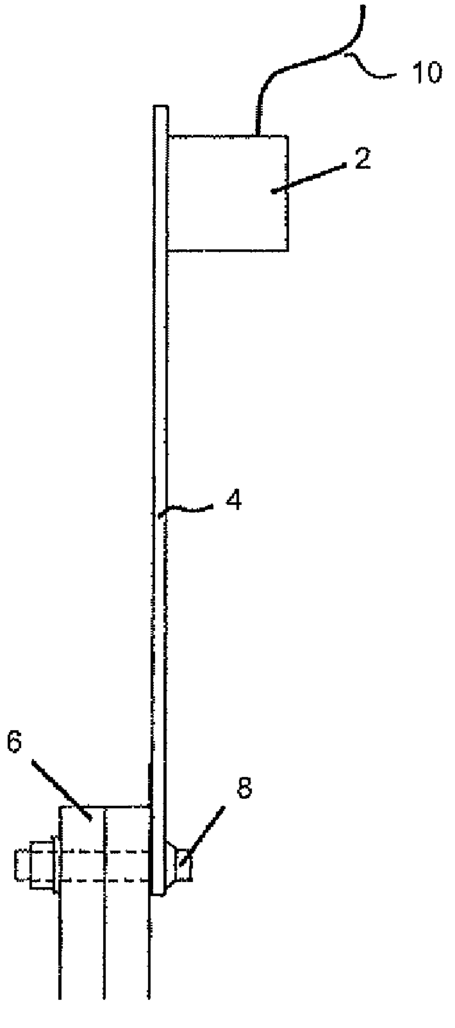
Figure 1a PRIOR ART
FIGS. 1*a* and 1*b* show a prior art arrangement of a transducer mount.
Figure 1B:
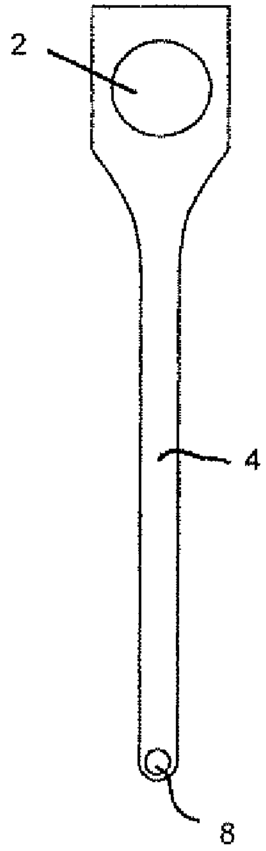
Figure 1b PRIOR ART
Figure 2A:
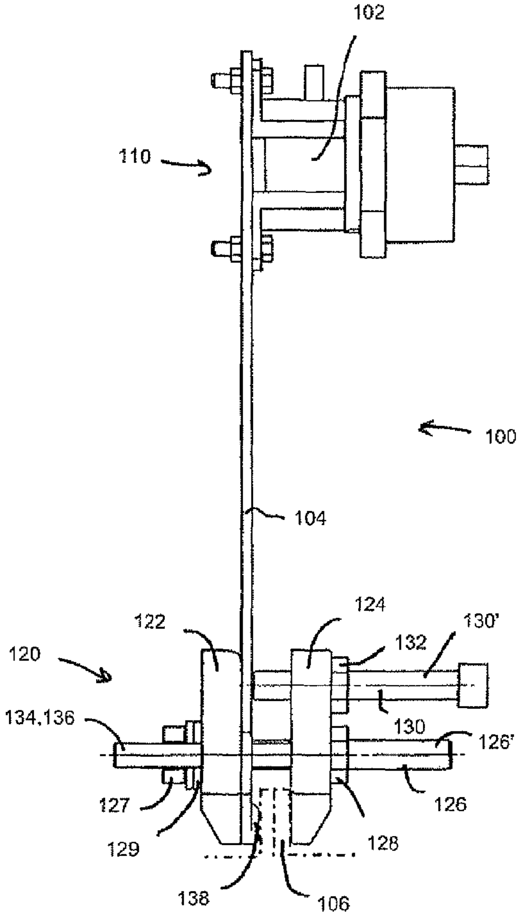
FIGS. 2*a*, 2*b* and 2*c* show a transducer mount according to an example of the present invention in a side on view (FIG. 2*a*), an end on view (FIG. 2*b*) and perspective view (FIG. 2*c*)
Figure 2B:
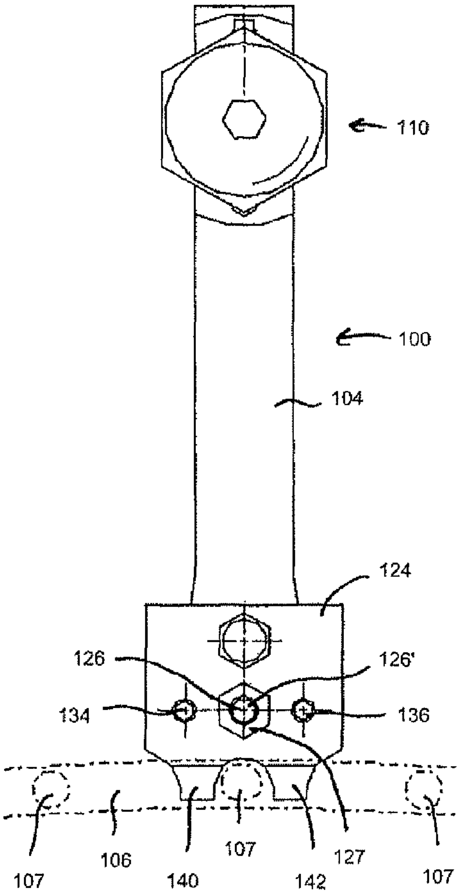
Figure 2C:
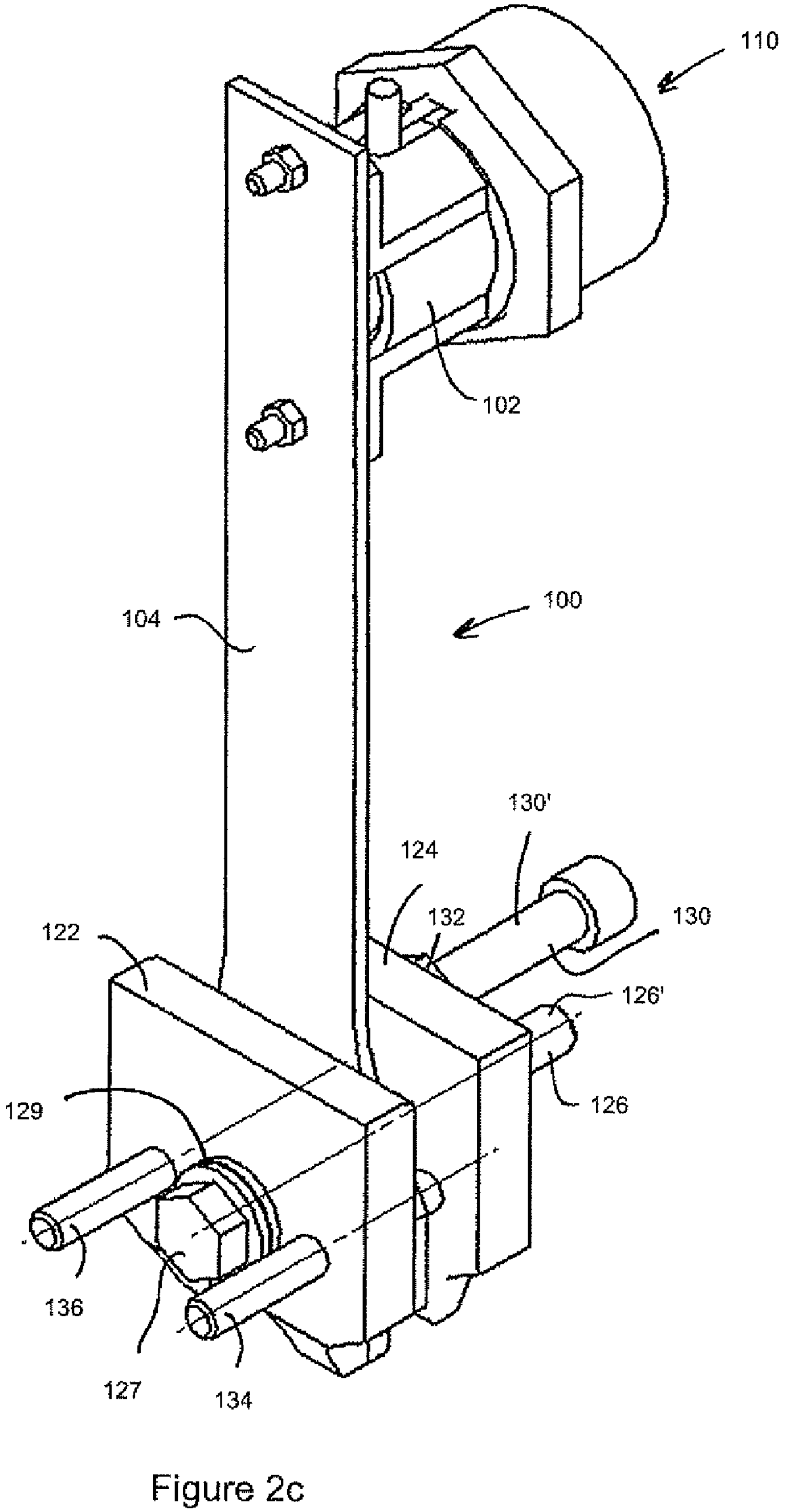
Figure 3:
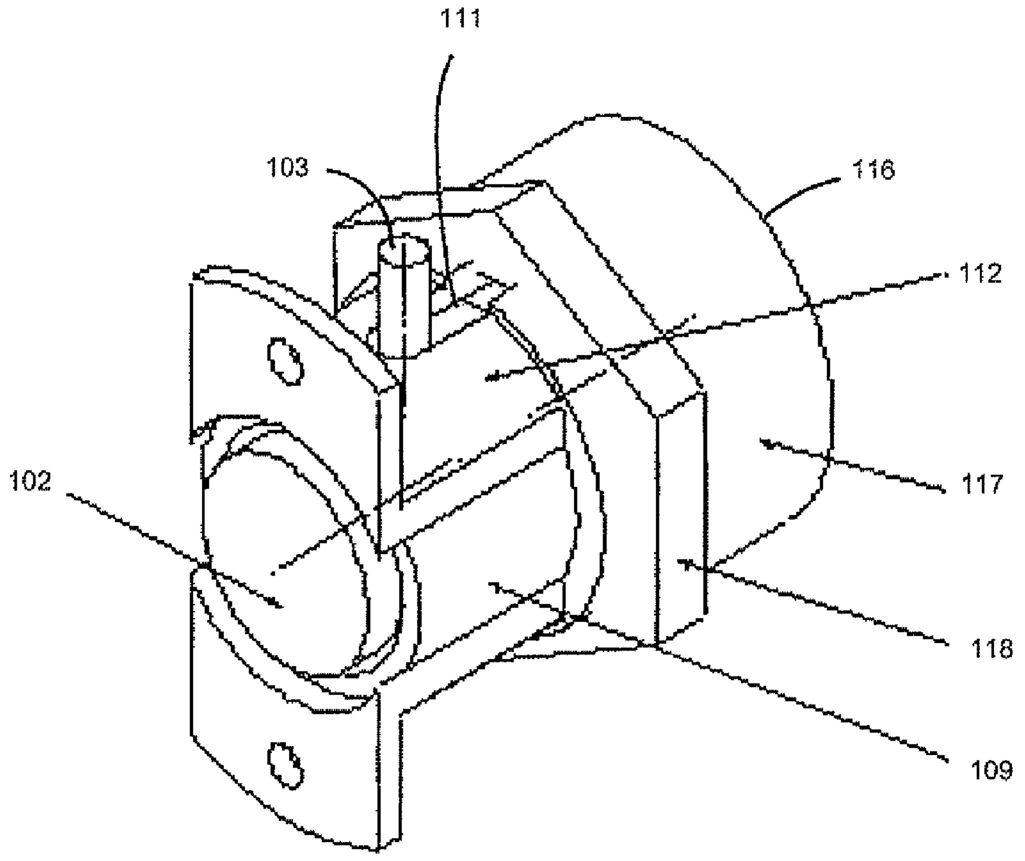
FIG. 3 shows a transducer housing according to an example of the present invention.
Figure 4A:
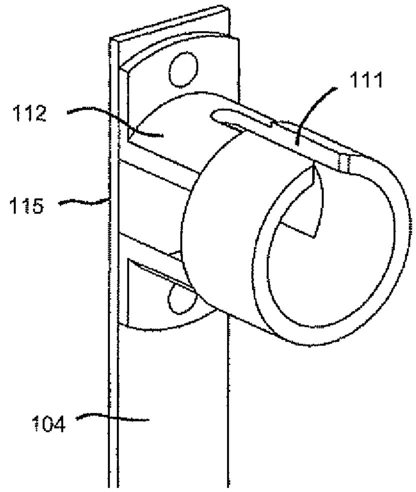
FIGS. 4*a*, 4*b*, 4*c* and 4*d* show a method of installing a transducer into the transducer mount according to an example of the present invention.
Figure 4B:
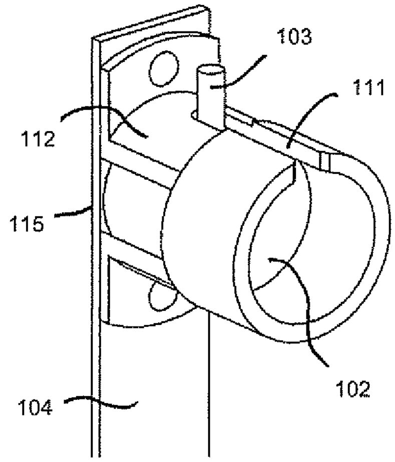
Figure 4C:
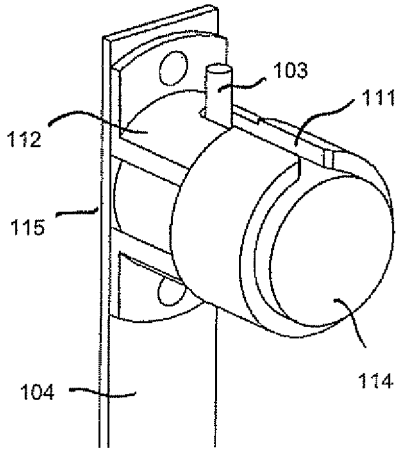
Figure 4D:
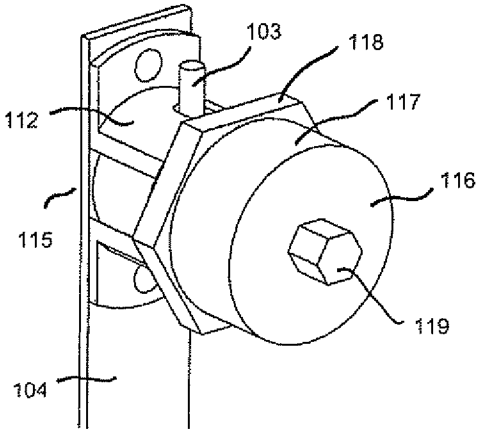

With reference to FIGS. 2*a*, 2*b* and 2*c*, a transducer assembly 100 for connecting a transducer 102 to a device (not shown), according to an example of the present invention, comprises a transducer mount 110 and a vice-like clamp 120. The transducer mount 110 is adapted to receive the transducer 102. The transducer mount 110 may be provided at a first end of an elongate member 104 and the clamp 120 may be connected to a second end of the elongate member 104. (Alternatively, the transducer mount may be provided directly on the clamp.) The clamp 120 comprises first and second jaws 122, 124, the first and second jaws being adapted to selectively clamp to a flange portion 106 of the device. As such, the transducer assembly 100 is held in place through contact friction with the flange portion 106.

The device may for example be a gas turbine engine, an automotive engine or chassis, a marine engine or hull, a nuclear reactor, a large civil beam construction or any flanged pipeline. The transducer 102 may sense acoustic stress wave magnitudes and/or frequencies, vibration, sound, temperatures, pressures, chemical compositions or any other factors. For example, the transducer 102 may comprise a MFET vibration transducer, an accelerometer, a microphone, a thermocouple or any other type of sensor which converts an external environmental variable into a readable signal.

The clamp 120 comprises a first tightener 126 adapted to apply a first force to secure the first and second jaws 122, 124 either side of the flange portion 106. The first force is applied at a first location spaced apart from the flange portion 106. The first tightener 126 comprises one or more first threaded bolts 126' passing through the first and second jaws 122, 124. The first threaded bolts 126' engage one or more corresponding first threaded portions 128 provided on the second jaw 124. Furthermore, the first threaded bolt 126' comprises a head portion 127 disposed so as to abut the first jaw 122, the second jaw being held by the first threaded portion 128. A resilient element 129 may be provided between the head portion 127 and the first jaw 122. The resilient element 129 may be a spring, Belleville washer, rubber washer or any other resilient means.

The clamp 120 further comprises a second tightener 130 adapted to apply a second force to secure the first and second jaws 122, 124 to the flange portion 106. The second force is applied at a second location spaced apart from the flange portion 106. The second location is spaced apart from the first location, and the first location is between the second location and the flange portion 106. In other words, the second tightener 130 is under compression when the clamp 120 is in the secured position. By contrast, the first tightener 126 is under tension when the clamp 120 is in the secured position.

The second tightener 130 comprises one or more second threaded bolts 130' passing through a second threaded portion 132 in the second jaw 124. An end of the second threaded bolt 130' is disposed so as to abut the first jaw 122. The clamp 120 further comprises first and second guide rails 134, 136. The guide rails are connected to the second jaw 124 and are received in corresponding holes in the first jaw 122. Alternatively, the guide rails may be connected to the first jaw and may be received in holes in the second jaw. The guide rails 134, 136 permit the first and second jaws 122, 124 to translate with respect to one another.

The second tightener 130 acts as a pinch bolt that serves to reduce bending in the first and second jaws 122, 124 and guide rails 134, 136 and allows for a more uniform contact pressure profile with the flange portion 106.

Alternatively, the second tightener may be omitted altogether. The first and second jaws may be pivoted with respect to one another and the first and second jaws may or may not cross at the pivot point. The pivot point may be located between the first location at which the first force is applied and the flange portion. Alternatively, the first location at which the first force is applied may be between the pivot point and the flange portion. Accordingly, the first tightener may be under a tensile or a compressive load when the clamp is in the secured position.

The first jaw 122 comprises a raised pad 138 disposed so as to contact the flange portion 106 of the device. The second jaw may additionally be provided with a raised pad. For a given torque in the first and or second threaded bolts 126', 130', the one or more pads 138 allow for a consistent contact pressure between the first and second jaws 122, 124 and the flange portion 106.

The first and second jaws 122, 124 are shaped to accommodate one or more bolts 107 passing through the flange portion 106. In particular, the first and second jaws 122, 124 may each comprise first and second protrusions 140, 142 which grip the flange portion 106 either side of the bolt 107. The geometry of the one or more pads 138 and first and second jaws 122, 124 is selected in order to fit the widest range of flanges possible, in particular gas turbine engine casing flanges. However, the jaw geometry and overall scale of the clamp may adapted according to the particular application.

The elongate member 104 connects to the clamp 120 and the elongate member 104 may connect between the first and second jaws 122, 124. In particular, the elongate member 104 may be adjacent to the first jaw 122 such that the end of the second threaded bolt 130' abuts the elongate member 104. The elongate member 104 may also be disposed between the first jaw 122 and the flange portion 106 such that the elongate member 104 contacts the flange portion 106 via the pad 138.

With reference to FIGS. 3 and 4*a*-*d*, the transducer mount 110 according to an example of the present invention comprises a housing 112, a resilient member 114 and first and second end walls 115, 116. The first end wall 115 may be operatively connected to the device (not shown), for example so that a vibration from the device may be transmitted to the transducer 102. The transducer 102 is held within the housing 112 and is held adjacent to the first end wall 115. The resilient member 114 is disposed between the transducer 102 and the second end wall 116. The housing 112 comprises a slot 111. The slot 111 is adapted to receive a cable 103 projecting from the transducer 102. The transducer mount 110 may further comprise an insulating sleeve 109 disposed about the transducer 102.

The transducer mount 110 further comprises a removable end cap 117. The second end wall 116 is provided by the end cap 117. The end cap 117 and housing 112 comprise corresponding threads so that the end cap 117 may threadably engage the housing. The end cap 117 further comprises spanner flats 118 to facilitate tightening of the end cap with respect to the housing. The end cap 117 may further comprise a boss 119 with a smaller diameter than that of the spanner flats 118. The boss 119 may assist in quickly rotating the end cap 117 with respect to the housing 112. The end cap 117 may be hand tightened to avoid over-torque. The end cap 117 may further comprise a cylindrical profile to aid hand tightening.

When in place, the end cap 117 holds the resilient member 114 against the transducer 102. The resilient member 114 in turn holds the transducer 102 against the first end wall 115. The resilient member 114 is compressed by the end cap 117 on assembly. The resilient member may comprise a foam material, a spring or any other member which biases the transducer towards the first end wall 115. A foam resilient member may be preferred as it may be less likely to resonate with the device. The resilient member may have a Young's modulus of approximately 0.06 GPa.

The transducer mount 110 connects to the elongate member 104 and the first end wall 115 of the transducer mount 110 may be provided by the elongate member 104.

Accordingly, the housing 112 may be connected to the elongate member 104. In the case of a vibration sensing transducer, the elongate member 104 may comprise a waveguide. Optimisation of the waveguide's natural frequency may be achieved by altering the thickness, density, and/or length of the waveguide.

The transducer mount 110 ensures that the transducer is held against the first end wall 115 with a minimum pressure whilst the transducer mount may be subjected to large heat fluctuations. This is achieved by the end cap 117 exerting pressure on the transducer 102 through the resilient member 114. If the elongate member 104 is subjected to a hot environment, the transducer mount 110 will thermally expand, allowing the resilient member 114 to decompress whilst ensuring that the transducer 102 maintains contact with the elongate member 104. Under the greatest expansion of the transducer mount 110, the resilient member 114 will remain under some compression, thereby ensuring a minimum contact pressure. The resilient member 114 also serves to protect the transducer 102 from excess pressure whilst the housing 112 is cooling, and therefore contracting.

Figure 5A:
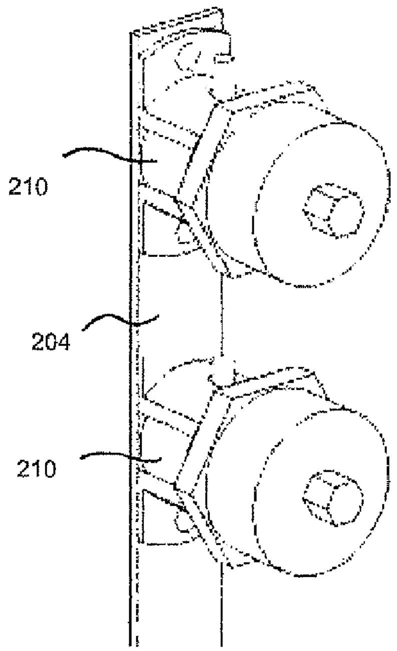
FIGS. 5*a*, 5*b* and 5*c* show further examples of the transducer mount according to the present invention.
Figure 5B:
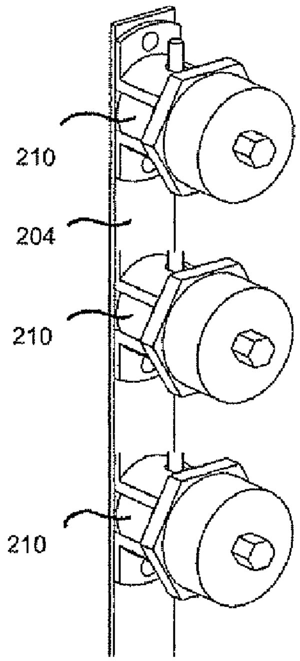
Figure 5C:
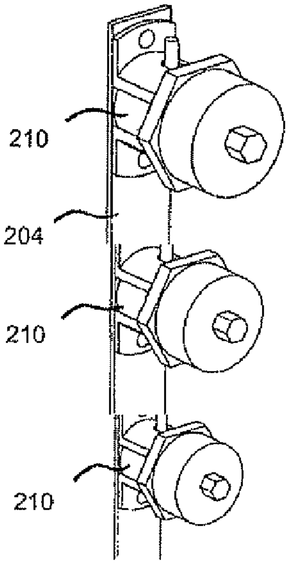

With reference to FIGS. 5*a-c*, a transducer assembly 200 according to a further example of the present invention, may comprise two or more transducer mounts 210 for holding two or more transducers. (NB, the clamps and flange portions have been omitted from these figures.) For example, an elongate member 204 may comprise equally sized transducer mounts and hence equally sized transducers (FIGS. 5*a* and 5*b*). Alternatively, the elongate member 204 may comprise differently sized transducer mounts and hence differently sized transducers (FIG. 5*c*). The two or more transducer mounts 210 may accommodate transducers that are responsive to different frequencies.

The aforementioned transducer assemblies 100, 200 may operate in high temperature environments, for example at device casing temperatures of up 600° C. The geometry of the elongate members 104, 204 may allow sufficient heat dissipation so that the transducer does not experience temperatures above a maximum rating for the transducer, which may for example be approximately 170° C. Thermal expansions of the flange portion 106 and the first and second jaws 122, 124 are accommodated by the use of the resilient element 129, which introduces flexibility to the assembly and maintains a consistent contact pressure.

An advantage of the present invention is that it allows the transducers to be mounted to production engines in addition to development engines. This will permit the gathering of important test data at a much higher rate than with the prior art systems. Furthermore, the transducer assemblies 100, 200 according to the present invention are non-invasive and require no disassembly of the engine whatsoever.

A further advantage of the transducer assemblies 100, 200, according to the present invention, is that they allow greater versatility in mounting location. The prior art systems can only be attached directly to engine casing flange bolts, whereas the present invention permits attachment to any lip or external surface with sufficient contact area on the device.

Further still, the transducer assemblies 100, 200, according to the present invention, maintain a minimum contact pressure of the transducer on the elongate member in both cold and hot environments. This is achieved through the use of the resilient member, eg foam, which is compressed on assembly in a cold environment. The resilient member has the further advantage of acting as a damper.

While the present invention has been described as being applicable to the mounting of many different transducer types, it has particular advantage in the mounting of transducers for the detection of acoustic stress waves.

Structural borne acoustic stress waves (or acoustic "emissions") are a subset of stress waves, typically restricted to frequencies between 80 kHz and 1 MHz. Acoustic emissions are caused by structural deformations of very low amplitude and have short wavelengths (ie in the order of millimetres). Thus standard accelerometers, which are sensitive only to large scale, bulk structural motions, cannot detect stress waves. Acoustic emissions are measured using piezo electric crystals which are deformed directly by the stress waves, rather than by inertial forces resulting from the acceleration of a connected mass. A transducer mount according to the present invention will minimise forces acting upon the transducer while it is in operation, which will result in more accurate data being collected from the transducer.

Acoustic emissions techniques are useful where inspection of a structure is difficult and the results of failure are severe. Events such as material corrosion, cracking, rubbing, supersonic airflow and flow cavitation all cause a release of energy within the acoustic emissions spectrum. Acoustic emissions monitoring techniques enable early detection of crack formation, reducing the likelihood of catastrophic failure and permitting corrective action to be taken without service interruption. Component failure can be predicted significantly before any visible structural damage has occurred, resulting in a significant increase in the window available to resolve problems compared with conventional vibration monitoring. Thus capturing acoustic emissions from engineering structures and machinery provides an opportunity for prognostic health monitoring in a non-invasive manner. A transducer mount according to the present invention provides a means for the collection of high quality data for use in such monitoring.

The invention claimed is:

1. A transducer mount for connecting a transducer to a device, the transducer mount comprising:

a housing;

a resilient member; and first and second end walls, the first end wall being operatively connected to the device, wherein the transducer is held within the housing and adjacent to the first end wall, the resilient member being disposed between the transducer and the second end wall, and the resilient member has a low Young's modulus to enable constant contact between the transducer and the first end wall.

2. The transducer mount of claim 1, wherein the transducer mount further comprises a removable end cap, the second end wall being provided by the end cap.

3. The transducer mount of claim 1, wherein the resilient member comprises a foam material.

4. The transducer mount of claim 1, further comprising an elongate member adapted to connect the transducer mount to the device.

5. A transducer assembly for connecting a transducer to a device, the transducer assembly comprising:

the transducer mount of claim 1; and a clamp comprising first and second jaws, the first and second jaws being adapted to selectively clamp to a flange portion of the device.

6. The transducer assembly of claim 5, wherein the clamp further comprises a first tightener adapted to apply a first force to secure the first and second jaws on either side of the flange portion, and wherein the first force is applied at a first location spaced apart from the flange portion.

7. The transducer assembly of claim 6, wherein the first tightener comprises one or more first threaded bolts passing through the first and second jaws, the first threaded bolts engaging one or more corresponding first threaded portions provided on one or more of the first and second jaws.

8. The transducer assembly of claim 7, wherein the first threaded bolt comprises a head portion disposed so as to abut one of the first and second jaws an other of the first and second jaws being held by the first threaded portion.

9. The transducer assembly of claim 8, wherein a resilient element is provided between the head portion and the one of the first and second jaws.

10. The transducer assembly of claim 5, wherein the clamp further comprises a second tightener adapted to apply a second force to secure the first and second jaws to the flange portion, and wherein the second force is applied at a second location spaced apart from the flange portion, and the first location is between the second location and the flange portion.

11. The transducer assembly claim 10, wherein the second tightener comprises one or more second threaded bolts passing through a second threaded portion in one of the first and second jaws, an end of the second threaded bolt being disposed so as to abut an other of the first and second jaws.

12. The transducer assembly of claim 5, wherein the clamp further comprises one or more guides disposed to permit the first and second jaws to translate with respect to one another.

13. A transducer assembly comprising the transducer mount of claim 1, and a transducer configured for detection of acoustic stress waves.

14. A gas turbine engine comprising the transducer mount of claim 1.

15. A gas turbine engine comprising the transducer assembly of claim 5.

* * * * *